United States Patent
Nainar et al.

(10) Patent No.: US 11,895,504 B2
(45) Date of Patent: Feb. 6, 2024

(54) FEDERATED MULTI-ACCESS EDGE COMPUTING AVAILABILITY NOTIFICATIONS

(71) Applicant: Cisco Technology, Inc., San Jose, CA (US)

(72) Inventors: Nagendra Kumar Nainar, Morrisville, NC (US); Robert E. Barton, Richmond (CA); Carlos M. Pignataro, Cary, NC (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 67 days.

(21) Appl. No.: 17/446,921

(22) Filed: Sep. 3, 2021

(65) Prior Publication Data

US 2023/0070468 A1     Mar. 9, 2023

(51) Int. Cl.
| | |
|---|---|
| *H04W 12/06* | (2021.01) |
| *H04W 76/10* | (2018.01) |
| *H04W 12/30* | (2021.01) |
| *H04L 9/40* | (2022.01) |

(52) U.S. Cl.
CPC ......... *H04W 12/35* (2021.01); *H04L 63/0815* (2013.01); *H04W 12/06* (2013.01); *H04W 76/10* (2018.02)

(58) Field of Classification Search
CPC ..... H04W 12/35; H04W 76/10; H04W 12/06; H04L 63/0815; H04L 47/80
See application file for complete search history.

(56) References Cited

U.S. PATENT DOCUMENTS

| | | | |
|---|---|---|---|
| 10,959,097 B1 | 3/2021 | Chen et al. | |
| 11,503,113 B2* | 11/2022 | Dong | H04L 67/289 |
| 2020/0389531 A1 | 12/2020 | Lee et al. | |
| 2021/0100070 A1 | 4/2021 | Sabella et al. | |
| 2021/0144203 A1 | 5/2021 | Low et al. | |
| 2021/0153271 A1 | 5/2021 | Yang et al. | |
| 2022/0086218 A1* | 3/2022 | Sabella | H04M 15/66 |
| 2022/0159535 A1* | 5/2022 | Rahman | H04W 12/06 |

(Continued)

OTHER PUBLICATIONS

Invitation to Pay Additional Fees and, Where Applicable, Protest Fee for PCT Application No. PCT/2022/0758285, dated Nov. 29, 2022.

(Continued)

*Primary Examiner* — Khawar Iqbal
(74) *Attorney, Agent, or Firm* — Patterson + Sheridan, LLP

(57) ABSTRACT

Federated multi-access edge computing availability notifications may be provided by: transmitting, from a User Equipment (UE) to an Access Point (AP) of a wireless network, an attach request for the wireless network that includes authentication credentials for an identity provider independent from the wireless network to authenticate the UE to the wireless network; receiving, at the UE via the AP, an authentication success message for the wireless network from the independent identity provider; transmitting, from the UE to the AP, a Multi-access Edge Computing (MEC) query; and receiving, at the UE from the AP, a MEC response that identifies MEC resources that are available to the UE based on an identity for the UE confirmed by the identity provider to the wireless network.

20 Claims, 11 Drawing Sheets

(56) References Cited

U.S. PATENT DOCUMENTS

| | | | |
|---|---|---|---|
| 2022/0166776 A1* | 5/2022 | Lee | H04L 63/0884 |
| 2022/0322379 A1* | 10/2022 | Macias | H04W 72/535 |
| 2022/0329649 A1* | 10/2022 | Feng | H04L 67/1001 |
| 2022/0337629 A1* | 10/2022 | Barton | H04L 63/0815 |
| 2022/0353732 A1* | 11/2022 | Filippou | H04W 28/0284 |
| 2022/0393956 A1* | 12/2022 | Venkata | H04L 41/0806 |
| 2023/0068386 A1* | 3/2023 | Akdeniz | G06N 3/063 |
| 2023/0106697 A1* | 4/2023 | Libby | G06F 9/5077 455/419 |
| 2023/0143554 A1* | 5/2023 | Rahman | H04W 12/062 370/331 |
| 2023/0177349 A1* | 6/2023 | Balakrishnan | G06N 3/08 706/25 |
| 2023/0283511 A1* | 9/2023 | Lee | H04L 67/10 709/220 |

OTHER PUBLICATIONS

Kiyemba Edris Ed Kamya et al: "The Case for Federated Identity Management in 5G Communications", 2020 Fifth International Conference on Fog and Mobile Edge Computing (FMEC), IEEE, 20 Ap. 1, 2020 (Apr. 20, 2020), pp. 120-127, XP033796717, DOI: 10.1109/FMEC49853.2020.9144855 [retrieved on Jul. 20, 2020] section A. Federated Identity Management (FidM)II; p. 121-p. 123; figures 1,2.

Shamseddine Hala et al: "A Novel, Federated Fog Architecture Embedding Intelligent Formation", IEEE Network, IEEE Service Center, New York, NY, US, vol. 35, No. 3, Oct. 12, 2020 (Oct. 12, 2020), pp. 198-204, XP011860715, ISSN: 0890-8044, DOI: 10.1109/MNET.011.2000505 [retrieved on Jun. 14, 2021] figure 1 section "Scheme Overview"; p. 199-p. 200 section "Adaptive Fog Federation Information"; p. 200-p. 201.

PCT, Notification of Transmittal of The International Search Report and The Written Opinion of The International Searching Authority, or The Declaration for Application PCT/US2022/075285 dated Jan. 23, 2023.

* cited by examiner

FEDERATED MULTI-ACCESS EDGE COMPUTING AVAILABILITY NOTIFICATIONS

TECHNICAL FIELD

Embodiments presented in this disclosure generally relate to network management. More specifically, embodiments disclosed herein relate to localizing multi-access edge computing sessions to a wireless network.

BACKGROUND

Various networks and services allow users, via associated User Equipment (UE), also referred to as a station (STA) or mobile station, to gain access to the services by associated identities. For example, a first service can provide access once a user confirms an identity or profile provided by the first service (e.g., a username/password combination). However, services can join together to share credentials and user identities to determine how and whether to provide access to an associated service based on an identity used by other services in an identity federation. One such service that can be offered to users is Multi-Access Edge Computing (MEC), also referred to a mobile edge computing, where the service provider offers access to cloud-based services hosted on an edge of a network as an alternative to a remotely-hosted version of those cloud-based services.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
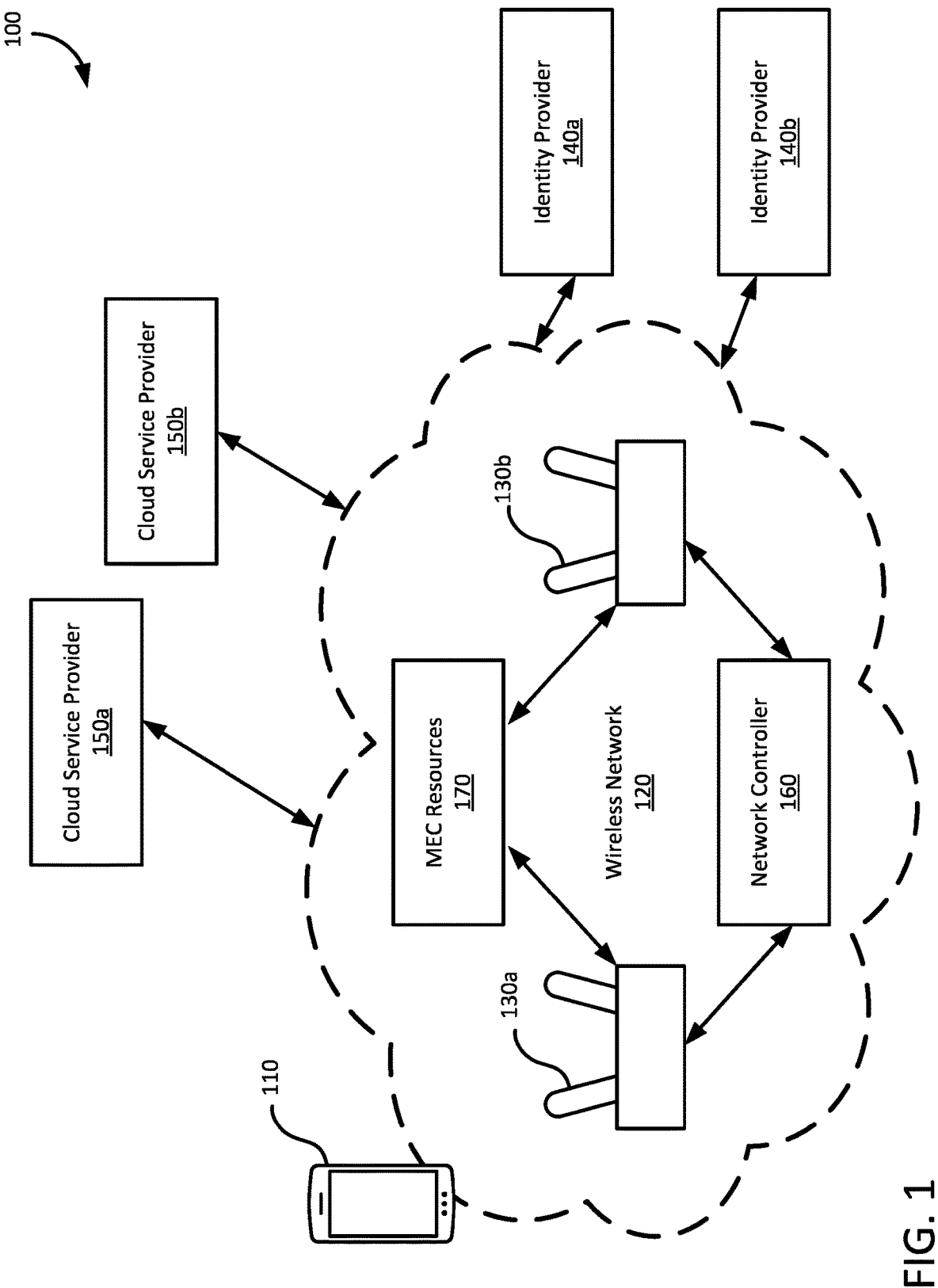
FIG. 1 illustrates a network environment that supports MEC provisioning in a federation-based access network, according to embodiments of the present disclosure.

One embodiment presented in this disclosure is a method, comprising: transmitting, from a User Equipment (UE) to an Access Point (AP) of a wireless network, an attach request for the wireless network that includes authentication credentials for an identity provider independent from the wireless network to authenticate the UE to the wireless network; receiving, at the UE via the AP, an authentication success message for the wireless network from the independent identity provider; transmitting, from the UE to the AP, a Multi-access Edge Computing (MEC) query; and receiving, at the UE from the AP, a MEC response that identifies MEC resources that are available to the UE based on an identity for the UE confirmed by the identity provider to the wireless network.

One embodiment presented in this disclosure is a method, comprising: notifying, by an Access Point (AP) of a wireless network, a User Equipment (UE) that the wireless network supports Multi-access Edge Computing (MEC); in response to receiving an attach request from the UE for the wireless network, forwarding, from the AP to an identity provider independent from the wireless network, authentication credentials for the UE to authenticate an identity of the UE on behalf of the wireless network; in response to the identity provider authenticating the UE: forwarding, from the AP to the UE, an authentication success message for attachment to the wireless network; and permitting the UE to access MEC resources in the wireless network based on the identity for the UE authenticated by the identity provider to the wireless network.

One embodiment presented in this disclosure is a method, comprising: receiving, at a data plane node of a cloud service provider, uplink data traffic from a UE attached to a wireless network that supports Multi-access Edge Computing (MEC); forwarding the uplink data traffic to an individual service hosted by the cloud service provider associated with the uplink data traffic; receiving, at a cloud edge orchestrator of the cloud service provider, MEC details that identify MEC resources in the wireless network are available to the UE to handle the individual service locally to the wireless network; establishing an offload orchestration session between the cloud edge orchestrator and the MEC resources to transfer performance of the individual service from the cloud service provider to the wireless network; and forwarding, from the data plane node to the UE, downlink data traffic responsive to the uplink data traffic from the individual service hosted by the cloud service provider until the offload orchestration session is complete.

Example Embodiments

The present disclosure provides for Multi-Access Edge Computing (MEC) offloading in federation-based access networks to bring services closer to the end users, and thereby reduce application latency compared to remote cloud services. The provider of the wireless network (as an Access Network Provider (ANP)) can notify the various users that the wireless network supports MEC for certain applications or user types and enable offload of the application from the various cloud service providers to the local wireless network, even when the cloud service provider belongs to a different domain than the entity used to authenticate the user to the wireless network.

FIG. 1 illustrates a network environment 100 that supports MEC provision in a federation-based access network, according to embodiments of the present disclosure. In FIG. 1, a UE 110 seeks to gain access to a wireless network 120, such as a cellular or Wi-Fi based wireless network offered to users in a public or private venue. The service provider can deploy the wireless network via one or more Access Points (APs) 130a-b (generally or collectively, AP 130), and set various controls on the wireless network 120 to confirm the authenticity of an identity of the user (via the UE 110) for permitting access to the wireless network 120. In various embodiments, the wireless network 120 includes a network controller 160 that communicates with the APs 130 to coordinate network management among the APs 130, although the APs 130 can also manage the network among themselves, thus omitting the network controller 160 in some embodiments.

The UE 110 may include any computing device that is configured to wirelessly connect to one or more APs 130. Example UE 110 can include, but are not limited to: smart phones, feature phones, tablet computers, laptop computers, desktop computers, Internet of Things (IoT) devices, and the like. In various embodiments, the UE 110 can also be referred to as a station (STA), a client device (CD), a user device, or an endpoint. Example hardware as may be included in a UE 110 is discussed in greater detail in regard to FIG. 7.

The APs 130 can offer wireless communication sessions in the wireless network 120 according to various Radio Access Technologies (RAT) and communications standards such as, but not limited to, "Wi-Fi" networking according to the various families, sub-standards, and derivatives of the IEEE 802.11 standard, cellular networking including various generations and subtypes thereof, such as, Long Term Evolution (LTE) and Fifth Generation New Radio (5G NR) networks, Citizens Broadband Radio Service (CBRS) networks, or the like. Example hardware as may be included in an AP 130 is discussed in greater detail in regard to FIG. 7.

The network controller 160, if included, may include any computing device or cloud based service that is configured to interface with two or more APs 130 to coordinate how spectrum and services are shared in the environment 100. The network controller 160 can be provided on a separate computing device connected to the individual APs 130 via wired or wireless communications, may be included with a "central" or "commander" AP 130, or may be provided in an ad hoc arrangement via a collective of two or more APs 130 negotiating among themselves for network management. Example hardware as may be included in a network controller 160 is discussed in greater detail in regard to FIG. 7.

When a UE 110 attempts to gain access to the wireless network 120 and associate with an AP 130, the network provider may request that the UE 110 provide an identity for the user so that services can be tracked and allocated properly to the UE 110. In various embodiments, the UE 110 can authenticate directly with the wireless network 120 (e.g., using an identity and credentials set up with the network provider) or can use an externally verified identity that is confirmed via one or more identity providers 140a-b (generally or collectively, identity provider 140). When a service provider (e.g., the network provider) allows for the use of a third-party identity provider 140 (also referred to as an IdP) to gain access to the provider's service (e.g., the wireless network 120), the service provider is said to offer a federated service or participate in an identity federation.

The identity providers 140 are entities that users can create and manage various identities through which the network provider may delegate authentication functions to. For example, the user can register with an identity provider 140 of a social network to gain access to the wireless network 120 by authenticating with the social network, which in turn, vouches for the authenticity of the user credentials and identifies the user to the network provider. Accordingly, the network provider, as a service provider, can avoid the need to set up individual accounts for each user attempting to gain access to the wireless network 120, and instead rely on one or more trusted identity providers 140 to verify the identity of the requesting users. In various embodiments, the services of an identity provider 140 can be an on-premises authentication service shared by several service providers in the wireless network 120 or an off-premises authentication service (e.g., a cloud-based service) used by several service providers offering one or several wireless networks 120. Example hardware as may be included in a server providing the services of an identity provider 140 is discussed in greater detail in regard to FIG. 7.

Once authenticated by the identity provider 140, the wireless network 120 grants access to the UE 110 based on the supplied credentials. In various embodiments, the authentication process can include the provision of a user name and associated with a given realm or domain (e.g., username at roaming.example.com, username at identities.example.co.uk), a password, authentication details (e.g., an answer to a security question), multifactor authentication confirmation, and the like.

In addition to the various identity providers 140, the UE 110 may connect, via the wireless network 120, to one or more cloud service providers 150a-b (generally or collectively cloud service provider 150) using associated credentials to access cloud-based or distributed computing services. For example, various applications (e.g., augmented reality or computer vision) may require more processing power than the UE 110 offers, so various functions and calculations are offloaded to a cloud service provider 150 to perform and transmit the results back to the UE 110 for display (rather than local calculation on the UE 110). The UE 110 can establish various data flows or streams with the cloud service provider 150 to send the data to process according to the offloaded functions and calculations, and to receive back corresponding processed data from the cloud service provider 150.

Because the cloud service providers 150 are located remotely from the wireless network 120, and are under the control of an independent party from the provider of the wireless network 120, data traffic for the UE 110 accessing the cloud service travels over various intervening networks between the wireless network 120 and the cloud service provider 150. The transmission delays for traveling over the intervening networks may vary based on the distance and networking conditions between the wireless network 120 and the cloud service provider 150, and can introduce an unpredictable amount of latency in the data traffic.

Different levels of transmission latency between the wireless network 120 and the cloud service providers 150 can be tolerated by different applications, but lower latency levels are generally preferable over higher latency levels, even for the applications that can function with high or unpredictable latency levels. Accordingly, the network provider may offer MEC resources 170 to some of all of the UE 110 attached to the wireless network 120. The MEC resources 170 perform the offloaded calculations in place of the cloud service provider 150, but at the edge of the wireless network 120. Accordingly the MEC resources 170 allow the service provider to move the server-side portions of the cloud or distributed service closer to the end-user, and thereby avoid the added latency associated with traversing networks beyond the wireless network 120.

However, for a UE 110 to access a given MEC resource 170, the UE 110 first learns what MEC resources 170 are available. The mere presence of MEC resources 170 in the wireless network 120 does not guarantee that a given UE 110 will be granted access to a given MEC resources 170, as several UEs 110 may seek to use the MEC resources 170, and the network controller 160 or an orchestrator in the MEC resources 170 may selectively grant or deny access to the MEC resources 170 (e.g., using an identity-based priority scheme, first-come-first-served, a throttled allowance, etc.). Accordingly, an exchange of MEC details between the UE 110 and the wireless network 120 may be performed as discussed in relation to FIGS. 2A-2B and 3A-3B to inform the UE 110 of the available MEC resources 170 in the wireless network 120.

Once the UE 110 is informed of the MEC details of the available MEC resources 170, and decides to make use of those MEC resources 170, the cloud service provider 150 is signaled to offload services from the cloud-based resources to the MEC resources 170. However, as the identity provider 140 used to authenticate the user in the wireless network 120 may be a separate entity from the cloud service provider 150, the cloud service provider 150 also may be informed of what MEC resources 170 are made available to the UE 110 in the wireless network 120. Accordingly, the UE 110 may establish a control plane-based offload session (e.g., as discussed in relation to FIG. 4) or a data plane-based offload session with the cloud service provider 150 (e.g., as discussed in relation to FIGS. 5 and 6A-6C).

The offload session transfers performance of the cloud-based elements of the service from the cloud service provider 150 to the MEC resources 170 local to the wireless network 120. Accordingly, the UE 110 maintains access to the distributed computing functions, but removes the higher and less predictable latency associated with the intervening networks between the wireless network 120 and the cloud service provider 150.

Figure 2A:
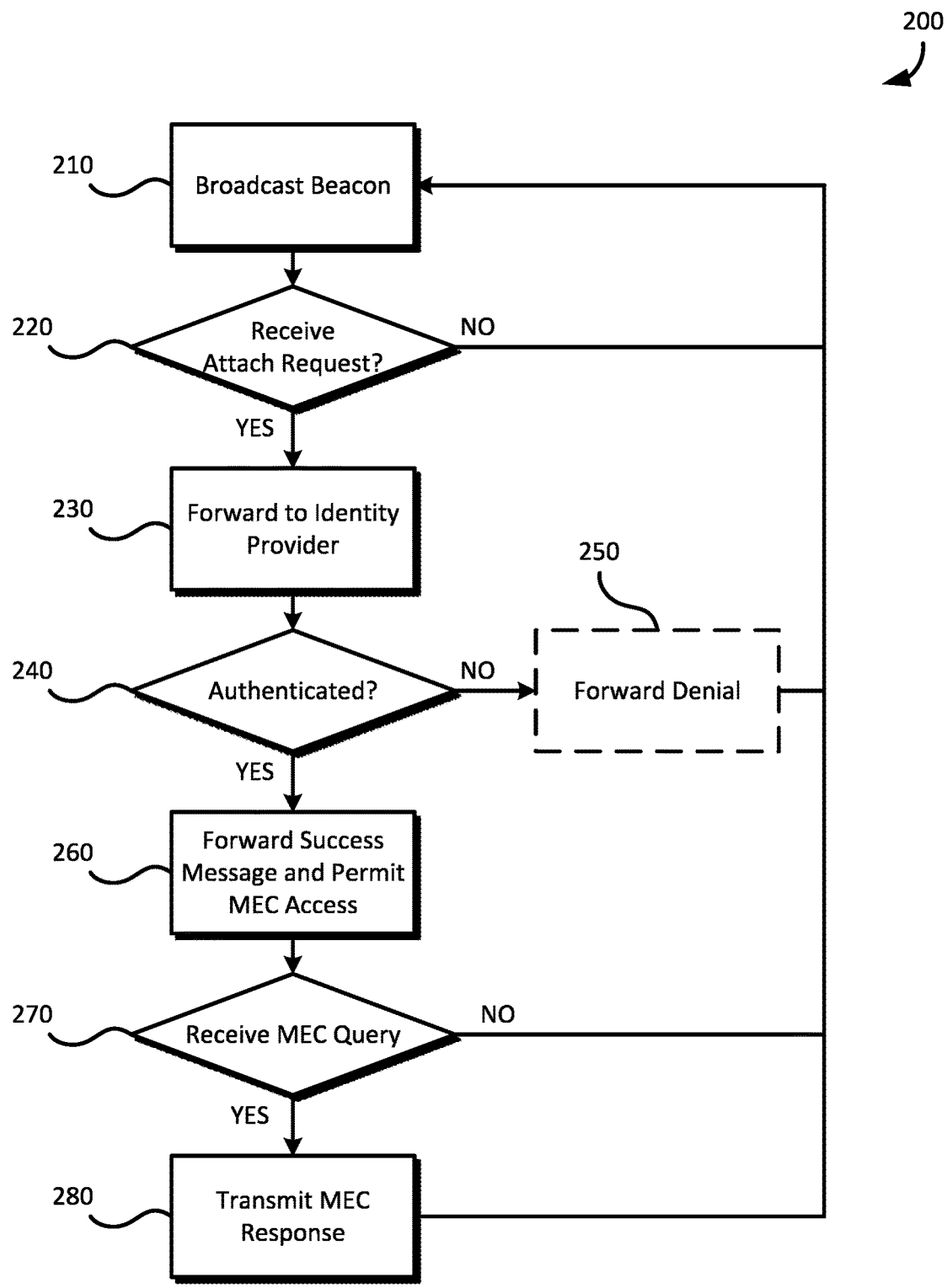
FIGS. 2A and 2B illustrate a method for a UE and an AP to identify that a wireless network offers MEC support, according to embodiments of the present disclosure.
Figure 2B:
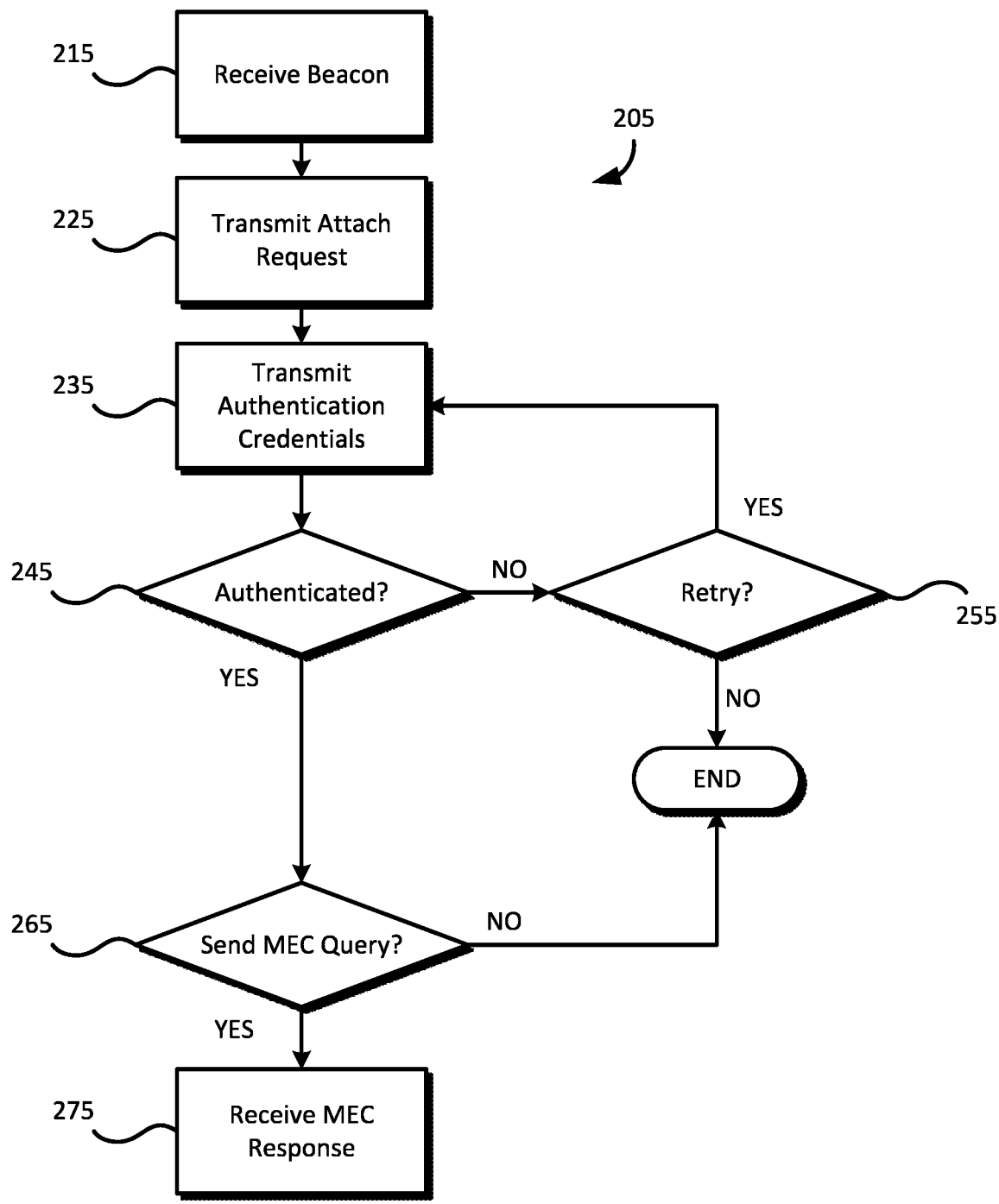

FIGS. 2A and 2B illustrate a method for a UE 110 and an AP 130 to identify that a wireless network 120 offers MEC support, according to embodiments of the present disclosure. FIG. 2A provides details from the perspective of an AP 130 in the wireless network 120, while FIG. 2B provides details from the perspective of the UE 110. Method 200 shown in FIG. 2A may be understood in conjunction with method 205 shown in FIG. 2B, but both methods may also be understood separately from one another.

Method 200 begins at block 210, where an AP 130 broadcasts a beacon signal to the environment. The beacon signal alerts various devices in the environment of the presence of the wireless network 120, and is used in various station-keeping functions within the wireless network 120. In various embodiments, the beacon signal includes a MEC notification, that identifies that the wireless network 120 offers MEC resources 170. In some embodiments, the MEC notification is included in an Access Network Query Protocol (ANQP) or other management frame and may include data such as available MEC resources 170, supported edge orchestrators, catalogs of available application or MEC services identities of specific available resources, per-user availability of resources, current use rates of the resources, or the like.

As beacon signals are transmitted at various intervals, different beacon signals may include or omit MEC notifications. For example, a first beacon signal out of a sequence of X beacon signals may include a MEC notification, while the remaining X−1 beacon signals in the sequence may omit the MEC notification.

At block 220, the AP 130 determines whether an attach request has been received from a UE 110. If no new attach requests are received, method 200 may return to block 210 to send the next beacon signal. The AP 130 may send beacon signals at a known time interval (e.g., every X seconds). When a new attach request is received, method 200 proceeds to block 230.

At block 230, the AP 130 forwards authentication credentials from the UE 110 attempting to access the wireless network 120 to an identity provider 140. In various embodiments, the authentication credentials can include a username, password, identifying biometric, secret pattern, or the like to identify and authenticate the identity of a user. The identity provider 140 may be selected from one or more identity providers 140 supported by the wireless network 120 by the UE 110 via a domain or realm included in the authentication credentials. The identity provider 140 is an independent entity from the provider of the wireless network 120, and authenticates the user on behalf of the network provider. In various embodiment, the identity provider 140 may be the same entity or a different entity from the cloud service providers 150 used by the UE 110.

At block 240 the AP 130 (or a network controller 160) receives a response from the identity provider 140 regarding whether the authentication credentials were accepted or rejected, which may include confirmation from a secondary device associated with the user of the authentication attempt (e.g., multifactor authentication). When the user has been authenticated, method 200 proceeds to block 260. However, when the identity provider 140 has not authenticated the user, method 200 optionally proceeds to block 250 or returns to block 210.

At block 250, the AP 130 forwards a denial message to the UE 110, indicating that the authentication credentials have not been accepted by the identity provider 140. In various embodiments, method 200 may omit block 250, thus allowing the UE 110 to infer the rejection of the authentication credentials (e.g., after a time out period).

At block 260, the AP 130 forwards a success message to the UE 110, indicating that the authentication credentials have been accepted by the identity provider 140. The AP 130 also permits the UE 110 to access the wireless network 120m and the MEC resources 170 offered therein, according to the accepted credentials. In various embodiments, the wireless network 120 may offer differentiated levels of service to different UEs 110 (e.g., based on service level agreements with different identity providers 140 or other external partners), which may include different priorities or access levels for the MEC resources 170 offered by the wireless network 120.

In various embodiments, the success message sent to the UE 110 can include a MEC notification or additional MEC details for the MEC resources 170 available to the specific UE 110. The MEC notification and MEC details may be sent in the success message in addition to or instead of a MEC notification in the beacon signals (e.g., per block 210). In addition, because the success message is unicast from the AP 130 to the authenticated UE 110, the MEC details included in the success message may be tailored to the MEC resources 170 that are available to the specific UE 110, instead of related to general policies or offerings of MEC resources 170 in the wireless network 120.

At block 270, the AP 130 determines whether a MEC query has been received from a UE 110. When no MEC query has been received, method 200 may return to block 210 to transmit the next scheduled beacon signal. However, when a MEC query is received from a UE 110 that requests additional details on the availability of MEC resources 170 for that UE 110, method 200 proceeds to block 280.

At block 280, the AP 130 transmits a MEC response to the requesting UE 110. In various embodiments, the MEC response includes answering data to the MEC query received in block 270. In various embodiments, the MEC response includes identities of specific available resources, per-user availability of resources, current use rates of the resources, supported edge orchestrators, catalogs of supported applications or MEC services, etc., or answers to specific query questions included in the MEC query. For example, if the MEC query includes a query for where the UE 110 stands in a queue or prioritization scheme for access to a given MEC resource 170, the AP 130 may respond with a number or priority level (e.g., device X of Y in queue, priority level Z) or an indication that the UE 110 has qualified (or not) for access to MEC resources 170. After sending the MEC response, method 200 may return to block 210 to transmit the next scheduled beacon signal.

Method 200 may also be understood from the perspective of the UE 110 as method 205, as is shown in FIG. 2B. Method 205 begins at block 215, when a UE 110 receives a beacon signal for a wireless network 120 from an AP 130 (e.g., transmitted per block 210). In various embodiments, the beacon signal can include various information about MEC support in the wireless network 120 (and the MEC resources 170 offered therein), or may omit such information.

At block 225, in response to receiving the beacon signal and determining to attach to the associated wireless network 120, the UE 110 transmits, to the AP 130, an attach request for the wireless network 120. In various embodiments, the AP 130 and the UE 110 may exchange various probe requests and responses to attach the UE 110 to the wireless network 120, at which time the AP 130 requests authentication credentials for access to the wireless network 120 and (optionally) the MEC resources 170 offered by the wireless network 120.

At block 235, the UE 11 transmits authentication credentials for an identity provider 140 to the AP 130 for the AP 130 to forward to the identity provider 140 (e.g., per block 230) to thereby authenticate a user of the UE 110 on behalf of the wireless network 120. In various embodiments, the authentication credentials can include a username, a password (or other secret or biometric marker to confirm the identity of the user supplying the credentials), and a domain or realm to confirm the identity of the user.

At block 245, the UE 110 determines whether the authentication credentials were accepted by the identity provider 140. When the UE 110 determines that authentication has failed (e.g., due to a time out period expiring or receipt of a denial message from the AP 130), and method 205 proceeds to block 255 for the UE 110 to determine whether to retry authentication. When the UE 110 determines that authentication has succeeded (e.g., due to receipt of a success message from the AP 130), method 205 proceeds to block 265, where the UE 110 determines whether to send a MEC query to the AP 130.

At block 255, after determining that authentication has failed, the UE 110 determines whether to retry authenticating with the wireless network 120. When the UE 110 determines to not retry authenticating with the wireless network 120, method 205 may conclude. When the UE 110 determines to retry authenticating with the wireless network 120, method 205 returns to block 235 to transmit authentication credentials again to the AP 130. In various embodiments, when returning to block 235, the UE 110 prompts the user to supply different authentication credentials (e.g., re-entering usernames and passwords, providing different usernames/passwords, selecting a different domain/realm or identity provider 140) or may resubmit the previous authentication credentials without further user input (e.g., automatically responding to a time out period expiring due to connectivity issues).

At block 265, the UE 110 transmits, to the AP 130, a MEC query to request additional information on the MEC resources 170 that are available to the UE 110. In various embodiments, the MEC query can request specific information about the MEC resources 170 (e.g., whether a MEC resource 170 exists for a given process flow, application, or cloud service provider 150), or the provision of MEC resources 170 in the wireless network 120 (e.g., where the UE 110 stands in queue for access to already-assigned MEC resources 170, MEC resources 170 that are offered in the wireless network 120 that are not presently available to the UE 110).

At block 275, the UE 110 receives, from the AP 130, a MEC response that identifies MEC resources 170 that are available to the UE 110. In various embodiments, the wireless network 120 can provide differentiated service levels based on an identity for the UE 110 that is confirmed by the identity provider 140 to the wireless network 120. Method 205 may then conclude.

Figure 4:
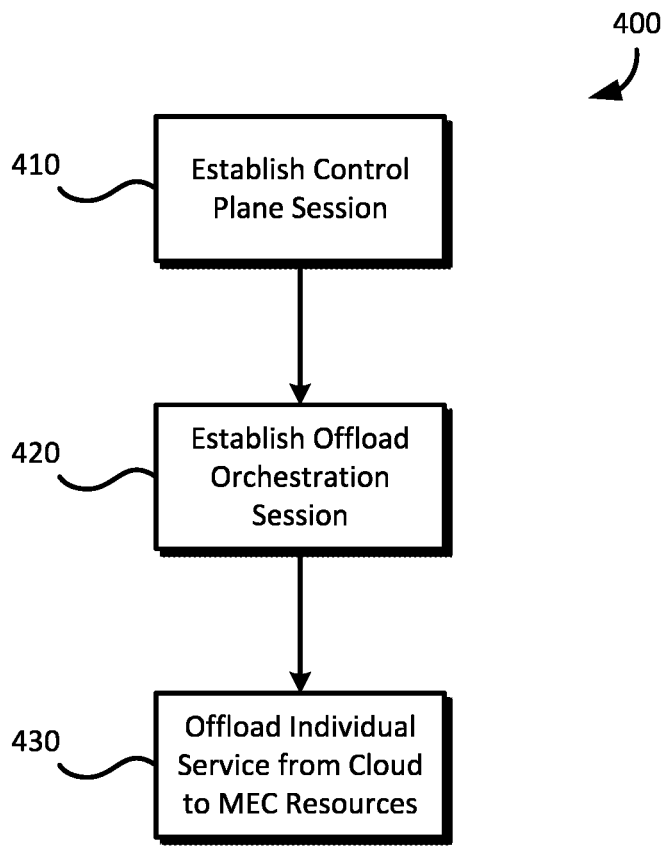
FIG. 4 is a flowchart of a method for establishing an offload orchestration session between a cloud service provider and the MEC resources using a control plane session, according to embodiments of the present disclosure.
Figure 5:
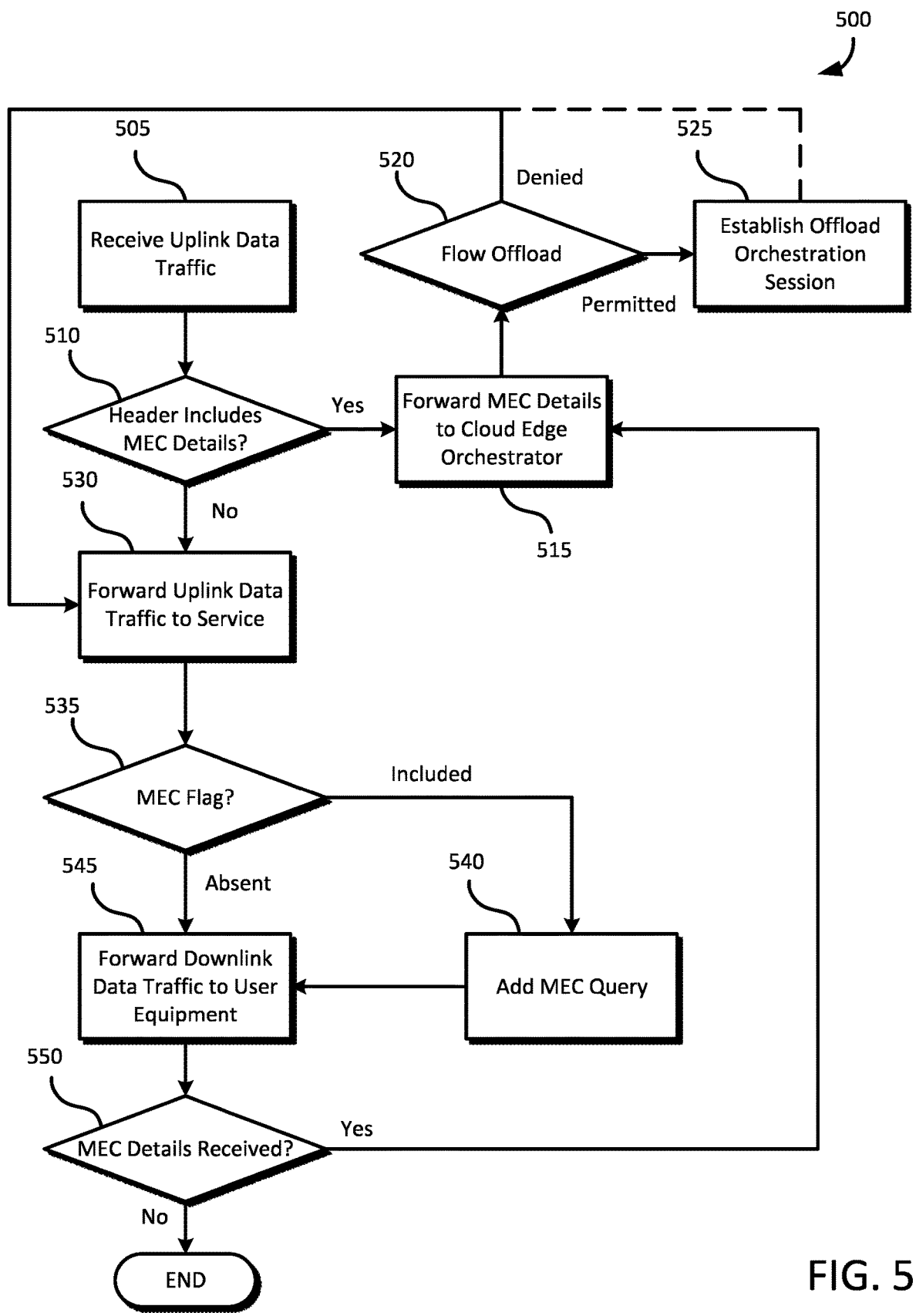
FIG. 5 is a flowchart of a method for establishing an offload orchestration session between a cloud service provider and the MEC resources using a data plane session, according to embodiments of the present disclosure.

On conclusion of method 205, the UE 110 may use the MEC details learned from the wireless network 120 to request offload of one or more applications (or individual data traffic flows or processes thereof) from a cloud service provider 150 to the available MEC resources 170 according to methods such as those discussed in greater detail in regard to FIGS. 4 and 5.

Figure 3A:
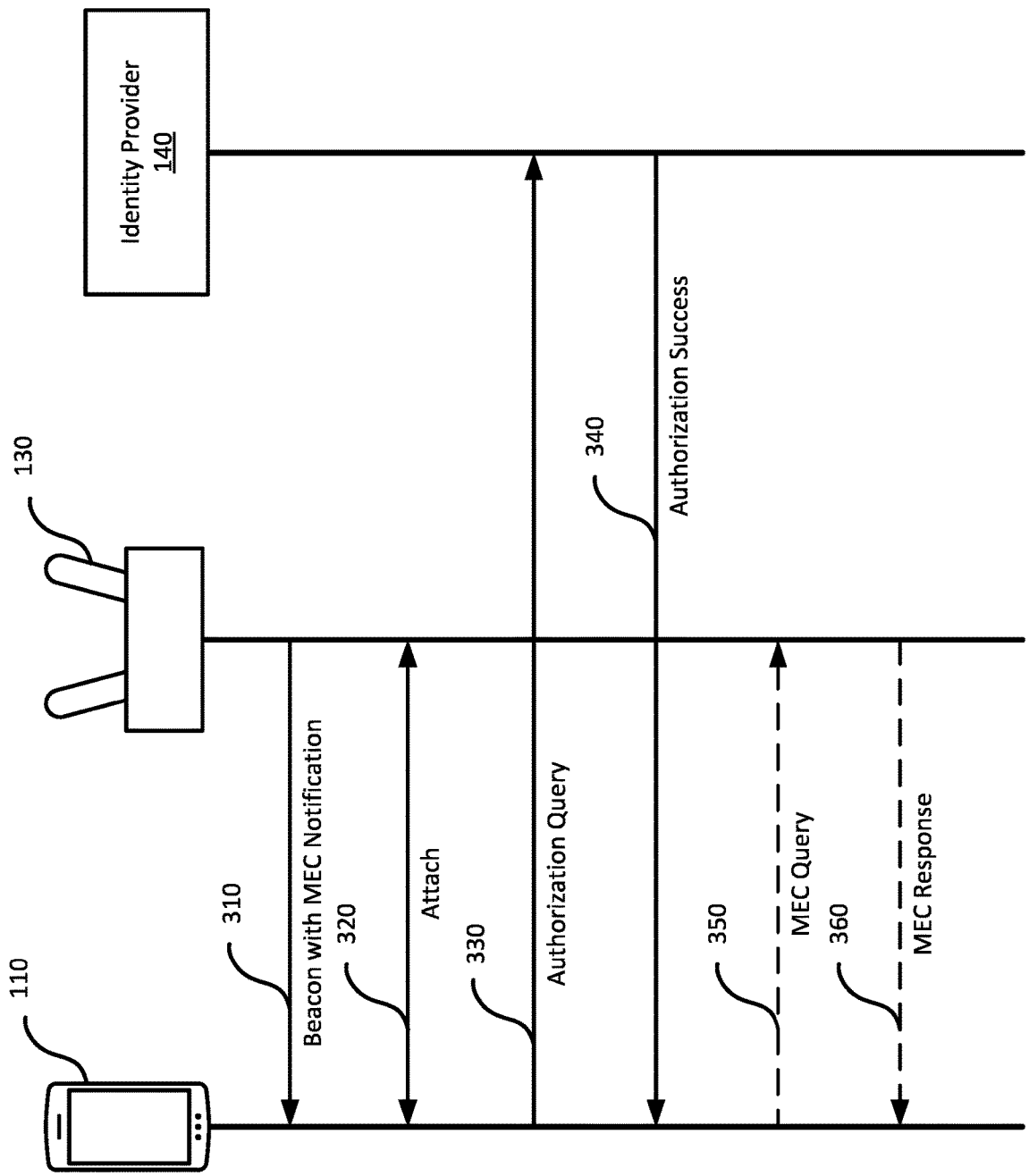
FIGS. 3A and 3B are timing charts for a UE and an AP to identify that a wireless network offers MEC support, according to embodiments of the present disclosure.
Figure 3B:
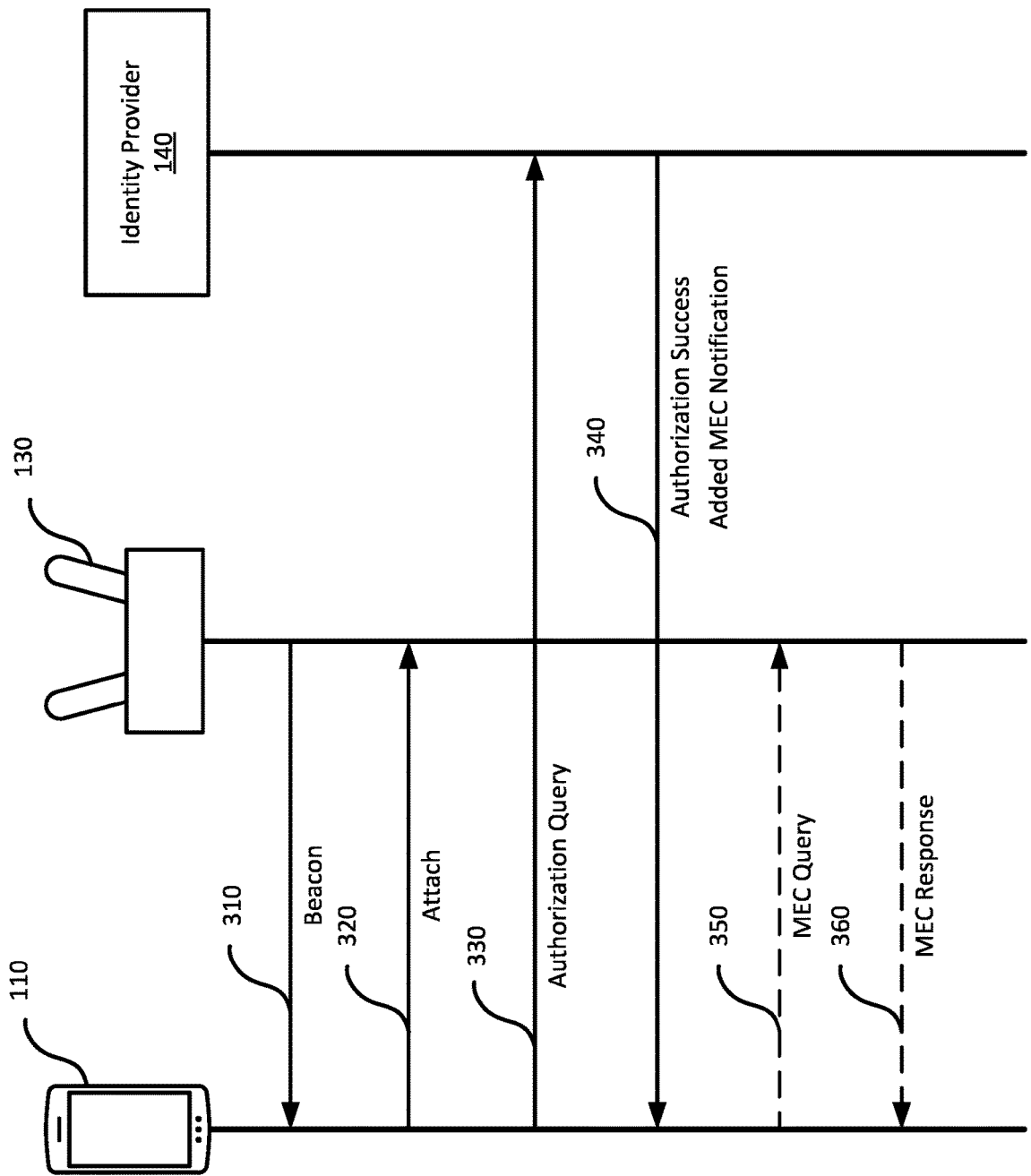

FIGS. 3A and 3B are timing charts for a UE 110 and an AP 130 to identify that a wireless network 120 offers MEC support, according to embodiments of the present disclosure. FIG. 3A illustrates timing for signal transmission in beacon signals 310 identity that the wireless network 120 offers MEC support, and FIG. 3B illustrates timing for signal transmission in which the authorization success message 340 signals identify that the wireless network 120 offers MEC support.

In FIG. 3A, the AP 130 sends a beacon signal 310 that includes a MEC notification to the UE 110. In contrast, in FIG. 3B, the AP 130 sends a beacon signal 310 to the UE 110 that does not include a MEC notification. In various embodiments, the MEC notification included in the beacon signal 310 in FIG. 3A can include details related to the MEC resources 170 offered by the wireless network 120 including whether MEC is supported, identities of specific available resources, per-user availability of resources, current use rates of the resources, supported edge orchestrators, catalogs of supported applications or MEC services, etc. In various embodiments, the MEC details can be includes in an ANQP frame or other management frame.

In both FIGS. 3A and 3B, after the UE 110 receives the beacon signal 310, the UE 110 and the AP 130 negotiate an attach procedure 320 for the UE 110 to connect to the wireless network 120 offered by the AP 130. In various embodiments, the attach procedure 320 can include probe requests and responses to attach the UE 110 to the wireless network 120 for the initial onboarding of the UE 110 to the wireless network 120.

In both FIGS. 3A and 3B, after the UE 110 is attached to the wireless network 120, the UE 110 sends an authorization query 330 to the AP 130, which the AP 130 forwards to an identity provider 140 outside of the wireless network 120 to authenticate an user on behalf of the wireless network 120. In various embodiments, the authorization query can identify the domain/realm that the user is to be authenticated in or a specific identity provider 140 that is to authenticate the user to the wireless network 120. The authorization query 330 can also include the credentials used to authenticate the user (e.g., username, password, biometric data, etc.). Although not illustrated, multifactor authentication queries and responses between the UE 110 or a second device associated with the user of the UE 110 and the identity provider 140 (or multifactor authentication service used by the identity provider 140) may be used in addition to the user credentials included in the authorization query 330 to authenticate the user.

Once the identity provider 140 has authenticated the user of the UE 110, the identity provider 140 transmits an authorization success message 340 to the wireless network 120 (e.g., the network controller 160 or the AP 130). In FIG. 3A, the AP 130 forwards the authorization success message 340 to the UE 110 to notify the UE 110 that the credentials and identity submitted in the authorization query 330 have been accepted.

In FIG. 3B, the AP 130 forwards the authorization success message 340 to the UE 110 with an added MEC notification to notify the UE 110 that the credentials and identity submitting in the authorization query 330 have been accepted and that MEC resources 170 are offered by the wireless network 120. In some embodiments, when the identity provider 140 has previously exchanged MEC-support information with the wireless network 120 (e.g., as part of initial set-up or on-boarding of the identity provider 140 for use with the wireless network 120), the identity provider 140 augments the authorization success message 340 to include a MEC notification or MEC details. For example, the identity provider 140, on authentication of the user, can signal the appropriate availability of MEC resources 170 to the user (e.g., based on service level agreements for particular identity/user types). In other embodiments, once the wireless network 120 receives the authorization success message 340 from the identity provider 140, the authorization success message 340 is augmented (e.g., by the AP 130 or network controller 160) to include the MEC notification or MEC details.

The MEC notification included with the authorization success message 340 can include details related to the MEC resources 170 offered by the wireless network including whether MEC is supported, identities of specific available resources, per-user availability of resources, current use rates of the resources, supported edge orchestrators, catalogs of supported applications or MEC services, etc. The inclusion of a MEC notification in the authorization success message 340 (as in FIG. 3B) may be in addition to or instead of including a MEC notification in a beacon signal 310 (as in FIG. 3A). When included in the authorization success message 340 in addition to being included in the beacon signal 310, the MEC notification in the authorization success message 340 may include a greater amount of information, or resource availability specific to the UE 110 (e.g., generalized information in the beacon signal 310 and tailored information in the authorization success message 340). For example, when the MEC notification is included in the authorization success message 340, the MEC resources 170 identified to the UE 110 may be based on a user entitlement to differentiated service in the wireless network 120, a service level agreement between the identity provider 140 (or an external partner) and the provider of the wireless network 120, etc. Accordingly a user of a first UE 110 and a user of a second UE 110 may receive the same generalized MEC notifications in the beacon signals 310, but may receive different tailored MEC notifications in the respective authorization success messages 340.

In addition to the MEC notification(s) received in one or more of the beacon signals 310 and the authorization success messages 340, the UE 110 may send a MEC query 350 to the AP 130 to learn additional or updated details related to the availability of MEC resources 170 to the UE 110. In various embodiments, the UE 110 transmits the MEC query 350 in response to the MEC notification including partial data related to the MEC resources 170. For example, the MEC notification may indicate that the MEC resources 170 are present in the wireless network 120, but not identify whether the UE 110 is permitted to use those MEC resources 170 (e.g., a general notification for MEC support). In another example, the MEC query 350 is transmitted after learning that MEC resources 170 are potentially available in the wireless network 120, but that a higher-priority user is using those MEC resources 170, to check if the MEC resources 170 have become available to the UE 110 at a later time (e.g., after the higher-priority users have stopped using those MEC resource 170, a re-prioritization of users, as additional MEC resources 170 become available, etc.).

The AP 130 may respond to the MEC query 350 with a MEC response 360 that includes answering data to the MEC query 350. In various embodiments, the MEC response 360 includes identities of specific available resources, per-user availability of resources, current use rates of the resources, supported edge orchestrators, catalogs of supported applications or MEC services, etc., or answers to specific query questions included in the MEC query 350. For example, if the MEC query 350 includes a query for where the UE 110 stands in a queue or prioritization scheme for access to a given MEC resource 170, the AP 130 may respond with a number or priority level (e.g., device X of Y in queue, priority level Z) or an indication that the UE 110 has qualified (or not) for access to MEC resources 170.

In various embodiments, the AP 130 transmits the MEC response 360 in response to a MEC resource 170 becoming available for the UE 110 to verify whether the MEC resources 170 are still desired by the UE 110, when previously unavailable to the UE 110.

FIG. 4 is a flowchart of a method 400 for establishing an offload orchestration session between a cloud service provider 150 and the MEC resources 170 using a control plane session, according to embodiments of the present disclosure.

Method 400 begins at block 410, where the UE 110 establishes a control plane session with a cloud edge orchestrator of the cloud service provider 150. During the control plane session, the UE 110 exchanges the MEC details that identify the various MEC resources 170 available to the UE 110 in the wireless network 120. When seeking to offload several flows or processes to the MEC resources 170, the UE 110 can exchange MEC details with several different cloud orchestrators (e.g., associated with different corresponding cloud service providers 150) to individually exchange the MEC details, or to one cloud orchestrator to centrally manage how to offload the flow or process to the MEC resources 170.

At block 420, the cloud edge orchestrator establishes an offload orchestration session with a MEC edge orchestrator (or the network controller 160) for the MEC resources 170. During the offload orchestration session, the various processes or flows handled by the cloud service provider 150 are reassigned for processing and handling by various MEC resources 170 in the wireless network 120. To avoid interruptions or delays in service to the UE 110, the offload orchestration session coordinates which of the cloud service provider 150 and the MEC resources 170 handle the processes or flows and when the MEC resources 170 will take over and the cloud service provider 150 will cease handling the processes or flows.

At block 430, the cloud edge orchestrator offloads individual services or flows from the resources of the cloud service provider 150 to the MEC resources 170 available to the UE 110 according to the offload orchestration session. Method 400 may then conclude.

FIG. 5 is a flowchart of a method 500 for establishing an offload orchestration session between a cloud service provider 150 and the MEC resources 170 using a data plane session, according to embodiments of the present disclosure.

Method 500 begins at block 505, where a data plane node for the cloud service provider 150 receives uplink data traffic from a UE 110 that is attached to a wireless network 120 that offers MEC support. As part of receiving the uplink data traffic, the data plane node parses the header fields in the various frames to direct the data to various individual services in the cloud service provider 150 for processing those data.

At block 510, the data plane node determines whether the header information for the uplink data traffic includes MEC details for what MEC resources 170 to offload one or more flows to in the wireless network 120. When the header information includes the MEC details, method 500 proceeds to block 515 to handle the MEC details. Otherwise, if the header information does not include the MEC details, method 500 proceeds to block 530.

At block 515 the data plane node forwards the MEC details to a cloud edge orchestrator. In various embodiments, the MEC details can be included in an iOAM or other overlay header with some or all of the uplink data traffic (e.g., per block 510) or in a MEC response received from the UE 110 or network controller 160 (e.g., per block 550). The MEC details can include information related to the available MEC resources 170, the MEC edge orchestrator, or the like, for the cloud edge orchestrator to establish an offload orchestration session with the appropriate MEC resources 170.

At block 520, the cloud edge orchestrator determines whether the flow included in the uplink data traffic is eligible for offload to the indicated MEC resources 170. When the policies in the wireless network 120 or the cloud service provider 150 permit offload of the given flow, method 500 proceeds to block 525. Otherwise, when offload is denied, method 500 proceeds to block 530 for the data plane node to handle the uplink data traffic.

In various embodiments, the cloud edge orchestrator determines (before or during implementing an orchestration session) whether the UE 110 is permitted to offload a given flow or process to the MEC resources 170 by confirming that an identity authenticated for the UE 110 by an identity provider 140 (independent from both the cloud service provide 150 and the wireless network 120) is permitted by the wireless network 120 to access the MEC resources 170 to host the given flow/process. In other embodiments, before establishing an offload orchestration session, the cloud edge orchestrator determines whether the UE 110 is permitted to offload a given flow or process to the identified MEC resources 170 by locally confirming that an identity authenticated for the UE 110 by an identity provider 140 is permitted access to those MEC resources 170 based on policies previous supplied from the wireless network 120.

At block 525, the cloud edge orchestrator establishes an offload orchestration session with a MEC edge orchestrator for the permitted flow. The offload orchestration session manages the transfer of performance of the individual services from the cloud service provider 150 to the wireless network 120 while maintaining provision of the services during the transfer. In various embodiments, once an offload orchestration session is established, the cloud resources may cease processing the flow, and defer processing to the MEC resources 170. However, the cloud service provider 150 may continue processing uplink data traffic until the MEC resources 170 are ready to take over flow processing to thereby avoid interrupting the local operation of applications on the UE 110 that use distributed computing (from the cloud service provider 150 or the MEC resources 170). Accordingly, method 500 may conclude at block 525 or proceed to block 530 to handle any previously received or in-process uplink data traffic until offload to the MEC resources 170 is complete.

In various embodiments, the MEC edge orchestrator may exchange additional information with the cloud edge orchestrator during the orchestration session, indicating further MEC details to perform the offload.

At block 530, the data plane node forwards the uplink data traffic received from the UE 110 (per block 505) to the corresponding individual cloud-based service used to process those data on behalf of the UE 110.

At block 535, the data plane node determines whether the uplink data traffic included a MEC flag set to indicate that further MEC details for offload are available. In various embodiments, the MEC flag is included in the header field of some or all of the frames or packets of the uplink data traffic. The MEC flag can include one or more bits that indicate the presence of available MEC resource 170 in the wireless network 120, but do not include enough information related to the available MEC resources 170 for the cloud edge orchestrator to establish an offload orchestration session without additional details being supplied from the wireless network 120 or the UE 110. When a MEC flag is included, method 500 proceeds to block 540. Otherwise, when a MEC flag is absent, method 500 proceeds to block 545.

At block 540, the data plane node adds a MEC query to the downlink data traffic generated by the individual services handling the uplink data traffic. In various embodiments, the MEC query requests the MEC details not already known to the cloud service provider 150 for the given UE 110. For example, the MEC query can request information related to the available MEC resources 170, the MEC edge orchestrator, or the like, for the cloud edge orchestrator to establish an offload orchestration session with a MEC edge orchestrator or network controller 160 for the wireless network 120.

At block 545, the data plane node forwards downlink data traffic received from the individual services handling the uplink data traffic to the UE 110. The data plane node continues to forward downlink data traffic (related to received uplink data traffic) until an orchestration session is complete or otherwise identifies a break in the flow of traffic during which transfer of the services from the cloud service provider 150 can be transferred to the MEC resources 170 without disrupting data provision to the UE 110.

At block 550, the data plane node determines whether a response to a MEC query (sent per block 540) has been received. If no response has been received, either due to no MEC query being transmitted or the UE 110 or network controller 160 not responding within a response window, method 500 may conclude. If a response to the MEC query including additional MEC details is received, method 500 proceeds to block 515, where the data plane node forwards the MEC details to the cloud edge orchestrator for establishing an orchestration session to offload service to the MEC resources 170 identified in the received MEC details.

Figure 6A:
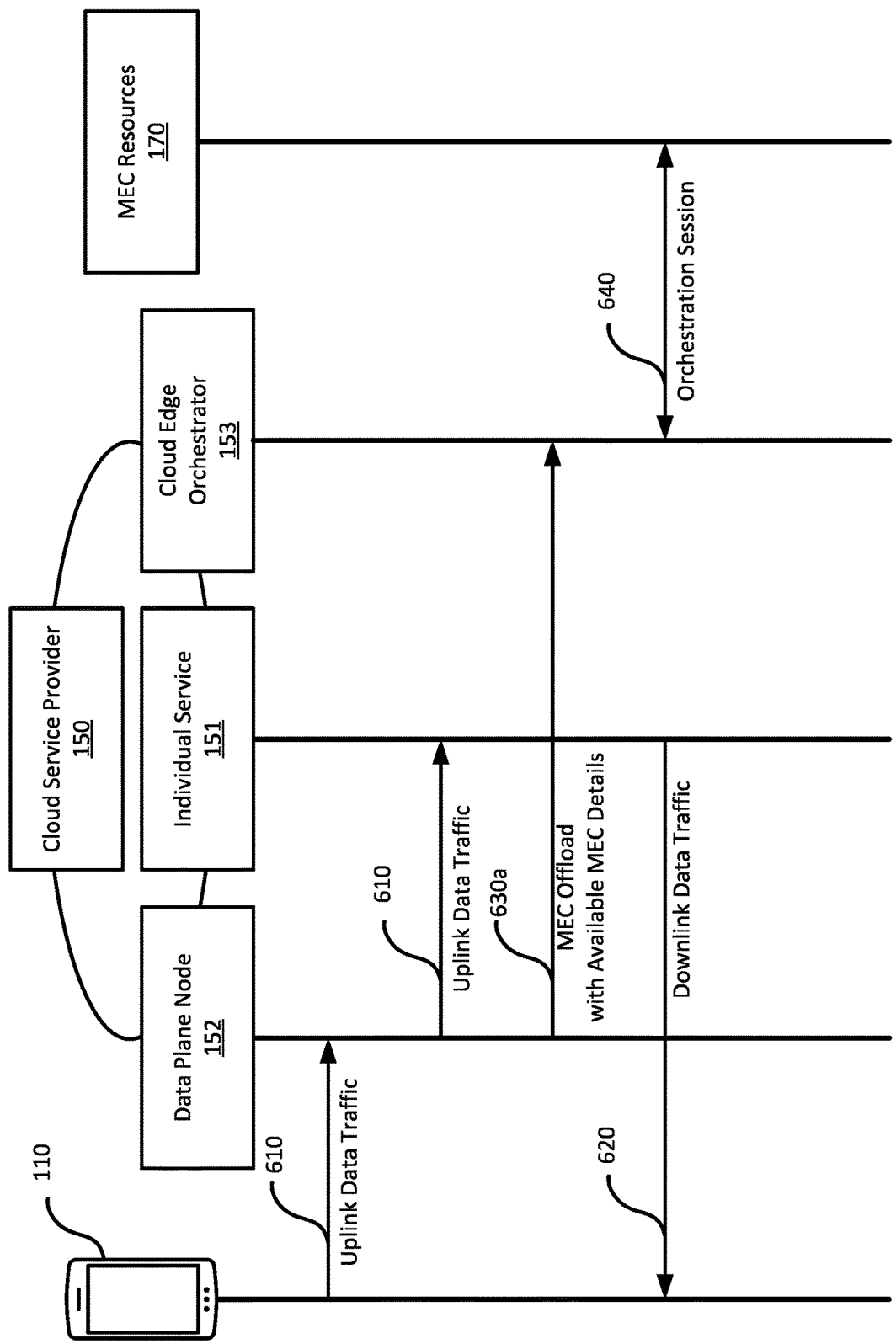
FIGS. 6A-6C are timing charts for establishing an offload orchestration session via a data plane, according to embodiments of the present disclosure.
Figure 6B:
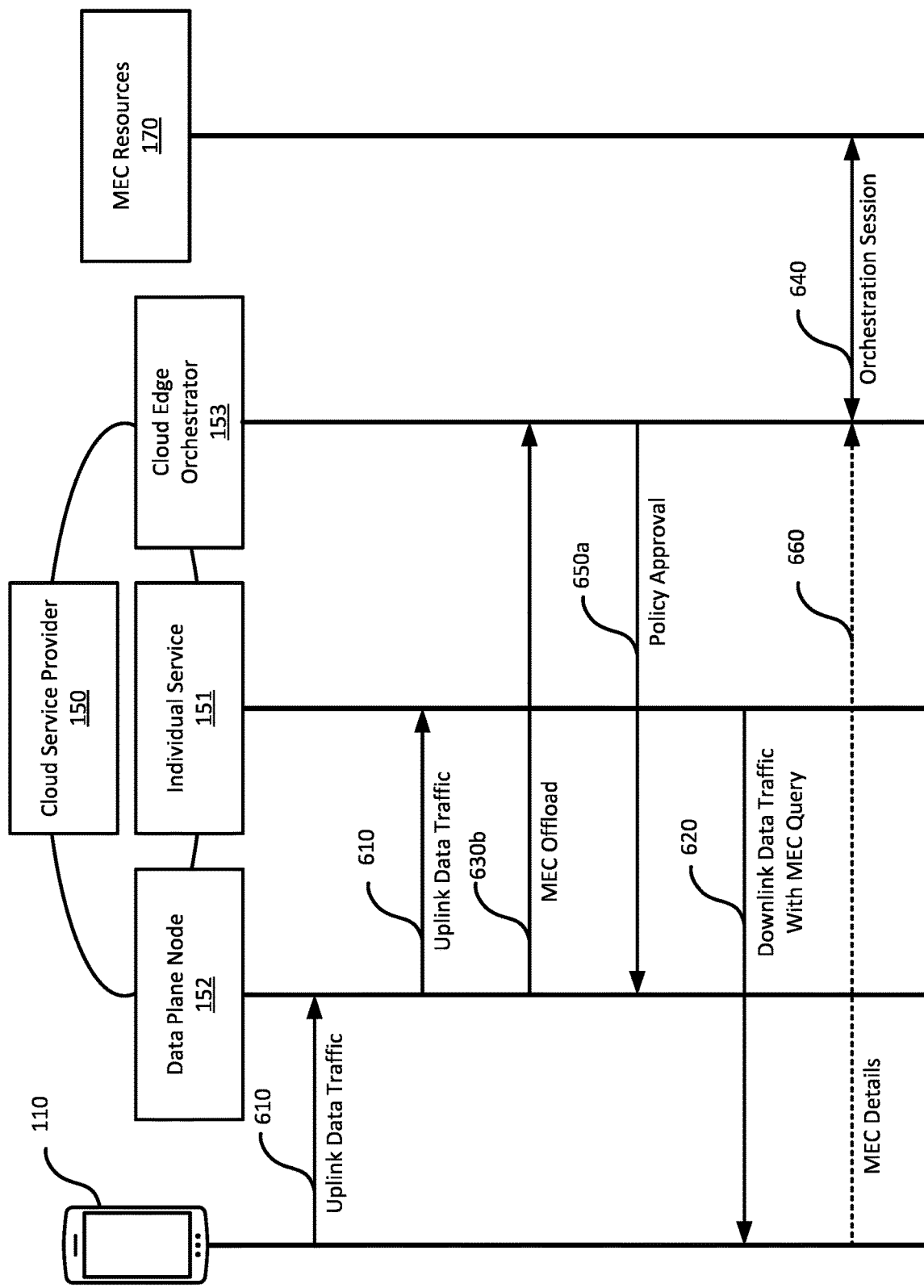
Figure 6C:
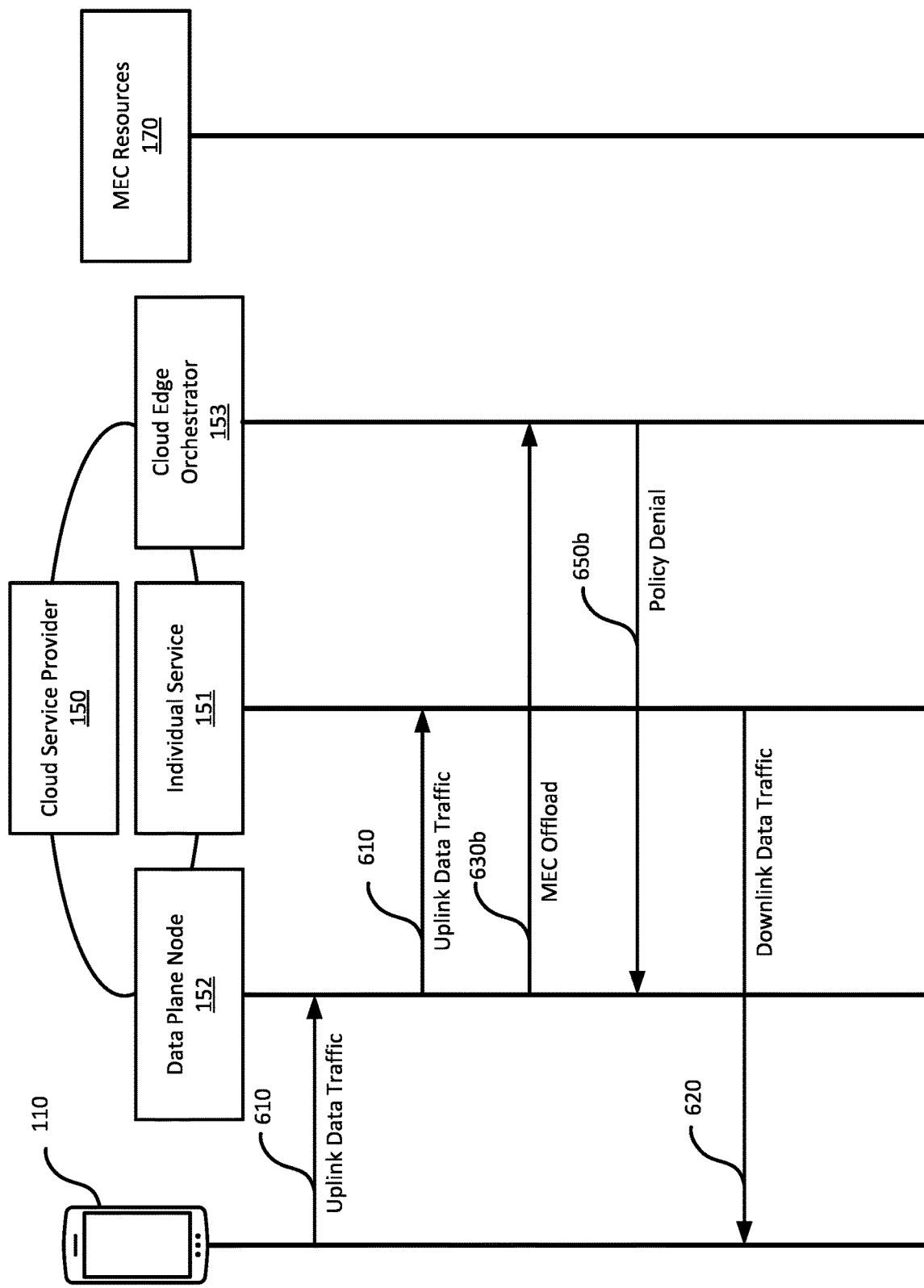

FIGS. 6A-6C are timing charts for establishing an offload orchestration session via a data plane, according to embodiments of the present disclosure. FIG. 6A illustrates timing for approved offloading triggered via header information in data traffic. FIG. 6B illustrates timing for approved offloading triggered via a flag in the data traffic. FIG. 6C illustrates timing for denied offloading triggered via a flag in the data traffic.

In each of FIGS. 6A-6C the uplink data traffic 610 are transmitted (via the wireless network 120) from the UE 110 to a data plane node 152 of the cloud service provider, and are forwarded to the individual service 151 used by the UE 110 on the cloud service provider 150. In various embodiments, the uplink data traffic 610 can include various inputs from the UE 110 that the cloud service provider 150 (via the individual service 151) processes to provide back to the UE 110 as downlink data traffic 620. The individual service 151 processes the uplink data traffic 610 and the data plane node 152 ensures that the resulting downlink data traffic 620 are transmitted back to the UE 110 as part of the cloud-based service.

The UE 110 can indicate that a transition to offload service from the cloud service provider 150 to the MEC resources 170 is desired by various MEC offload requests 630*a-b* (generally or collectively, MEC offload request 630).

When the uplink data traffic 610 includes MEC details that identify which of the MEC resources 170 are available to the UE 110, as in FIG. 3A, the data plane node 152 forwards a MEC offload request 630*a* (including the MEC details received from the UE 110) to the cloud edge orchestrator 153. The cloud edge orchestrator 153 uses the received MEC details to establish an orchestration session 640 with the MEC resources 170 (e.g., with a network controller 160 or a MEC edge orchestrator in the wireless network 120) to control which MEC resources 170 are assigned to take over provision of the service from the individual service 151, and when the handover is to be performed. In various embodiments, the MEC details are included in a header field of the uplink data traffic 610 (e.g., in the In-situ Operations, Administration and Maintenance (iOAM) or Overlay header), which the data plane node 152 parses to pass the MEC details onto the cloud edge orchestrator 153 to establish the offload orchestration session 640.

When the uplink data traffic 610 does not include MEC details, as in FIGS. 6B and 6C, the uplink data traffic may instead include a flag that indicates that offload from the cloud service provider 150 to the wireless network 120 is desired, but the MEC details to perform the offload should be requested from a MEC edge orchestrator for the MEC resources 170 (or a network controller 160). In various embodiments, the flag may be included (and set) in all of the uplink data traffic 610 or in a subset of the uplink data traffic 610 (e.g., the initial X packets of a given flow).

On detecting the flag, the data plane node 152 transmits a MEC offload request 630*b* to the cloud edge orchestrator 153 to check whether the flow requested for offload is permitted under local policies for offload or if the flow requires latency below a given threshold (e.g., for flows that require ultra-low latency). The cloud edge orchestrator 153 may respond with a policy approval 650*a*, as in FIG. 6B, indicating that offload is permitted, or with a policy denial 650*b*, as in FIG. 6C, indicating that offload is not permitted.

In some embodiments, when the data plane node 152 receives a policy approval 650*a*, the data plane node 152 adds a MEC query to the downlink data traffic 620 forwarded from the individual service 151 to the UE 110. The MEC query requests, from the UE 110, the MEC details 660 that identify which of the MEC resources 170 are available to the UE 110, which the data plane node 152 forwards to the cloud edge orchestrator 153 to establish an offload orchestration session 640 with the MEC resources 170.

As the routing of the uplink data traffic 610 is adjusted during the orchestration session 640 from the cloud service provider 150 to the MEC resources 170, the generation of the downlink data traffic 620 (and provision thereof) is also adjusted. To ensure that the UE 110 transmits uplink data traffic 610 to the correct service provider and continues to receive downlink data traffic 620 during offload, the cloud service provider 150 establishes an orchestration session 640 between the cloud edge orchestrator 153 and the MEC resources 170 in the wireless network 120 (e.g., via a MEC orchestrator). The orchestration session 640 ensures that the wireless network 120 reroutes the uplink data traffic 610 to the MEC resources 170 and provides the downlink data traffic 620 to the UE 110 from the MEC resources 170 and individual service 151 with a seamless transition in data provision. Accordingly, as shown in FIGS. 6A-6B, the cloud service provider 150 can continue to send downlink data traffic 620 to the UE 110 while the offload orchestration session 640 is in progress, or as is shown in FIG. 6C, may continue to send downlink data traffic 620 in case the MEC offload request 630 is rejected or denied.

Figure 7:
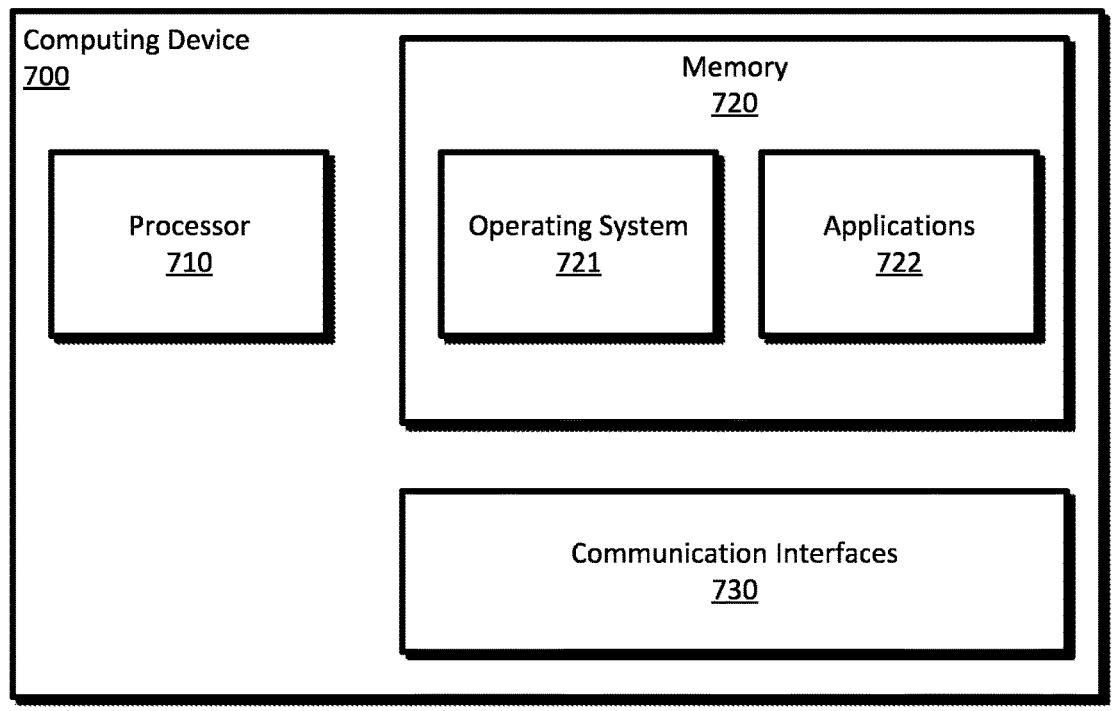
FIG. 7 illustrates hardware of a computing device, according to embodiments of the present disclosure.

FIG. 7 illustrates hardware of a computing device 700 such as can be included in a UE 110, an AP 130, a network controller 160, or a server used to provide the services of an identity provider 140, a cloud service provider 150, or MEC resources 170 as described herein. The computing device 700 includes a processor 710, a memory 720, and communication interfaces 730. The processor 710 may be any processing element capable of performing the functions described herein. The processor 710 represents a single processor, multiple processors, a processor with multiple cores, and combinations thereof. The communication interfaces 730 facilitate communications between the computing device 700 and other devices. The communication interfaces 730 are representative of wireless communications antennas (both omnidirectional and directional), various steering mechanisms for the antennas, and various wired communication ports including out-pins and in-pins to a microcontroller. The memory 720 may be either volatile or nonvolatile memory and may include RAM, flash, cache, disk drives, and other computer readable memory storage devices. Although shown as a single entity, the memory 720 may be divided into different memory storage elements such as RAM and one or more hard disk drives.

As shown, the memory 720 includes various instructions that are executable by the processor 710 to provide an operating system 721 to manage various functions of the computing device 700 and one or more applications 722 to provide various functionalities to users of the computing device 700, which include one or more of the functions and functionalities described in the present disclosure.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:
1. A method, comprising:
transmitting, from a User Equipment (UE) to an Access Point (AP) of a wireless network of a federated service, an attach request for the wireless network that includes authentication credentials for an independent identity provider in an identity federation, wherein the independent identity provider is external and independent from the wireless network and used to authenticate the UE to the wireless network;
forwarding, from the AP to the independent identity provider, the authentication credentials transmitted from the UE;
transmitting, from the independent identity provider to the AP, an authentication success message for the wireless network;
receiving, at the UE via the AP, the authentication success message for the wireless network from the independent identity provider;
transmitting, from the UE to the AP, a Multi-access Edge Computing (MEC) query; and
receiving, at the UE from the AP, a MEC response that identifies MEC resources that are available to the UE based on an identity for the UE confirmed by the independent identity provider to the wireless network.

2. The method of claim 1, further comprising, before transmitting the attach request, received a beacon signal at the UE from the AP that includes a notification that the wireless network supports MEC resources with differentiated service levels based on supplied identities.

3. The method of claim 1, wherein the authentication success message includes a notification that the wireless network supports MEC with differentiated service levels based on supplied identities.

4. The method of claim 1, further comprising, in response to the UE identifying that the wireless network offers the MEC resources to the UE:
 establishing, a control plane session between the UE and a cloud service provider for an application an application running on the UE hosted as an individual service by the cloud service provider;
 establishing, between a cloud edge orchestrator for the cloud service provider and a MEC edge orchestrator for the wireless network, an offload orchestration session for the application based on the MEC resources available to the UE from the wireless network; and
 offloading the application to the MEC resources from the cloud service provider.

5. The method of claim 1, further comprising, in response to the UE identifying that the wireless network offers the MEC resources to the UE:
 transmitting via the wireless network, from the UE to a cloud service provider, data traffic for an application running on the UE, wherein the data traffic includes a flag indicating that the MEC resources are available to the UE from the wireless network; and
 in response to the cloud service provider identifying the flag in the data traffic and establishing an offload session with a MEC edge orchestrator in the wireless network, offloading the application to the MEC resources from the cloud service provider.

6. The method of claim 1, further comprising, in response to the UE identifying that the wireless network offers the MEC resources to the UE:
 transmitting via the wireless network, from the UE to a cloud service provider, data traffic for an application running on the UE, wherein the data traffic includes a header field identifying the MEC resources that are available to the UE from the wireless network; and
 in response to the cloud service provider establishing an offload orchestration session with a MEC edge orchestrator in the wireless network, offloading the application to the MEC resources from the cloud service provider.

7. The method of claim 1, the UE is denied access to at least one MEC resource offered by the wireless network based on the identity supplied to the independent identity provider.

8. A method, comprising:
 notifying, by an Access Point (AP) of a wireless network of a federated service, a User Equipment (UE) that the wireless network supports Multi-access Edge Computing (MEC);
 in response to receiving an attach request from the UE for the wireless network, forwarding, from the AP to an independent identity provider in an identity federation, wherein the independent identity provider is external and independent from the wireless network, authentication credentials for the UE to authenticate an identity of the UE on behalf of the wireless network;
 in response to the independent identity provider authenticating the UE:
  transmitting, from the independent identity provider to the AP, an authentication success message for attachment to the wireless network;
  forwarding, from the AP to the UE, the authentication success message for attachment to the wireless network; and
  permitting the UE to access MEC resources in the wireless network based on the identity for the UE authenticated by the independent identity provider to the wireless network.

9. The method of claim 8, wherein the AP notifies the UE that the wireless network supports MEC via a beacon signal broadcast to a network environment.

10. The method of claim 8, wherein the AP notifies the UE that the wireless network supports MEC in the authentication success message forwarded to the UE.

11. The method of claim 8, further comprising:
 receiving, at the AP from the UE, a MEC query to identify which MEC resources of a plurality of MEC resources offered by the wireless network are available to the UE; and
 transmitting a MEC response, from the AP to the UE, that identifies the MEC resources of the plurality of MEC resources that are available to the UE based on the identity for the UE.

12. The method of claim 8, further comprising:
 forwarding, via the AP to a cloud service provider of an application used by the UE, MEC details that identify the MEC resources available to the UE.

13. The method of claim 12, wherein the MEC details are forwarded to the cloud service provider in response to the AP forwarding a MEC query to the UE from the cloud service provider in downlink data traffic for the application, wherein the MEC query is generated by a data plane node of the cloud service provider is response to a flag included in uplink data traffic forwarded by the AP to the cloud service provider that indicates that the wireless network supports MEC.

14. The method of claim 12, wherein the MEC details are forwarded to the cloud service provider in response to an offload orchestration session established between a cloud edge orchestrator of the cloud service provider and the MEC resources of the wireless network.

15. A method, comprising:
 receiving, at a data plane node of a cloud service provider of a federated service, uplink data traffic from a UE attached to a wireless network that supports Multi-access Edge Computing (MEC);
 forwarding the uplink data traffic from the data plane node to an individual service hosted by the cloud service provider associated with the uplink data traffic;
 receiving, at a cloud edge orchestrator of the cloud service provider, MEC details that identify MEC resources in the wireless network are available to the UE to handle the individual service locally to the wireless network;
 establishing an offload orchestration session between the cloud edge orchestrator and the MEC resources to transfer performance of the individual service from the cloud service provider to the wireless network; and
 forwarding, from individual service and the data plane node to the UE, downlink data traffic responsive to the uplink data traffic from the individual service hosted by the cloud service provider until the offload orchestration session is complete.

16. The method of claim 15, wherein the data plane node receives the MEC details in a header field of the uplink data traffic that identifies the MEC resources in the wireless network that are available to the UE and forwards the MEC details to the cloud edge orchestrator.

17. The method of claim 15, wherein the data plane node receives the MEC details in a response from the UE to a MEC query from the data plane node, wherein the response identifies the MEC resources in the wireless network that are available to the UE, wherein the UE triggers the data plane node to generate the MEC query via a flag included in the uplink data traffic.

18. The method of claim 15, wherein the MEC details are received at the cloud edge orchestrator in response to the wireless network forwarding the MEC details as part of the offload orchestration session established between the cloud edge orchestrator and the MEC resources of the wireless network.

19. The method of claim 15, wherein the cloud edge orchestrator determines that the UE is permitted to offload the individual service from the cloud service provider to the MEC resources of the wireless network in response to the cloud edge orchestrator confirming with the wireless network during the offload orchestration session that an identity authenticated for the UE by an independent identity provider from the wireless network is permitted by the wireless network to access the MEC resources to host the individual service.

20. The method of claim 15, wherein the cloud edge orchestrator determines that the UE is permitted to offload the individual service from the cloud service provider to the MEC resources of the wireless network in response to determining locally before establishing the offload orchestration session that an identity authenticated for the UE by an independent identity provider from the wireless network is permitted by the wireless network to access the MEC resources to host the individual service.

* * * * *